United States Patent Office 3,457,270
Patented July 22, 1969

1

3,457,270
DIHYDROPYRROLE AND TETRAHYDRO-
PYRIDINE COMPOUNDS
Robert W. Fleming, Cincinnati, Ohio, and Fred P. Hauck,
Jr., Ann Arbor, Mich., assignors to Parke, Davis &
Company, Detroit, Mich., a corporation of Michigan
No Drawing. Original application Aug. 12, 1964, Ser. No.
389,224, now Patent No. 3,412,154, dated Nov. 19,
1968. Divided and this application June 25, 1968, Ser.
No. 751,649
Int. Cl. C07d 31/00, 27/12; A61k 27/00
U.S. Cl. 260—295                                    1 Claim

ABSTRACT OF THE DISCLOSURE

4 - {[2 - (o-alkoxyphenoxy)ethyl]amino}butyrophenones, substitution products, homologs, cyclic anhydro derivatives, and salts. The compounds have pharmacological activity, especially as central nervous system depressants. They can be prepared by (a) acidic hydrolysis of an acetal or ketal, or (b) reaction of a cyclic amide with an aryl reactive metal compound under anhydrous conditions followed by hydrolysis of the product.

---

This is a division of co-pending application Ser. No. 389,224, filed Aug. 12, 1964, now U.S. Patent 3,412,154.

The present invention relates to new organic amines and methods for their production. More particularly, the invention relates to new amino-substituted phenones, to their cyclic anhydro derivatives, to salts thereof, and to methods for the production of the foregoing compounds.

The compounds of the invention can exist in various free base and salt forms. Thus they can exist in the ketonic free base form which can be represented by the formula

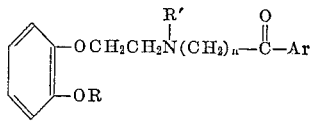

(I)

and in the ketonic acid-addition salt form which can be represented by the formula

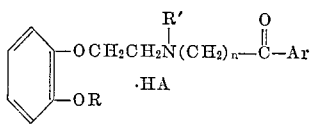

(II)

where R represents alkyl of fewer than 4 carbon atoms, R' represents hydrogen or alkyl of fewer than 4 carbon atmos, $n$ represents 3 or 4, Ar represents phenyl, halophenyl (preferably fluorophenyl or chlorophenyl), tolyl, methoxyphenyl, trifluoromethylphenyl, 2-thienl, or 2-pyridyl and A represents one equivalent of an anion, preferably a pharmaceutically-acceptable anion. The compounds of the invention in which the group R' as shown above represents hydrogen can also exist in the form of cyclic anhydro derivatives; specifically in the form of an anhydro free base derivative of the formula

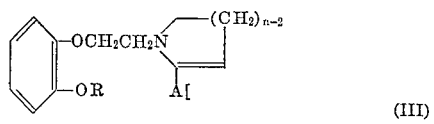

(III)

and in the form of an anhydro quaternary ammonium salt or imonium salt of the formula

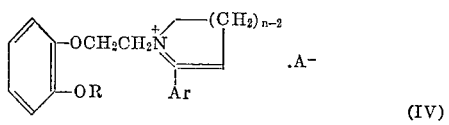

(IV)

where R, $n$, Ar and A are as defined before. It will be noted that the structures of Formulas III and IV differ from the structures of Formulas I and II by the elimination of the elements of one molecule of water and that additionally the free base of structure III differs from the quaternary ammonium salt or imonium salt of structure IV in the location of a double bond. By the proper selection of reaction and crystallization conditions, the compounds of the invention can be obtained in purified crystalline state in the ketonic form or in the form of the cyclic anhydro derivative. However, as the various forms exist in dynamic equilibrium in solution, they are equivalent for the purposes of the invention.

The compounds of the invention can be produced by reacting an acetal or ketal compound of the formula

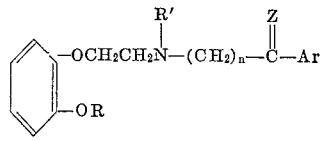

with water in an acidic medium whereby the acetal or ketal bonds are hydrolyzed with the production of a ketone group in the same position; where R, R', $n$, and Ar are as defined before and Z represents ethylenedioxy, trimethylenedioxy, or di-lower alkoxy in which each lower alkoxy group contains 1–6 carbon atoms. The reaction is carried out in an aqueous medium in the presence of an acid. Some suitable types of aqueous media are water and aqueous solutions of non-reactive, water-miscible solvents such as lower alkanols, acetone, tetrahydrofuran, ethylene glycol, dioxane, acetic acid and mixtures thereof. A preferred aqueous medium is an aqueous lower alkanol such as aqueous isopropyl alcohol. Preferred acids for use in the process are mineral acids such as hydrochloric, sulfuric, or phosphoric acid, or strong organic acids such as p-toluenesulfonic acid. While it is not necessary to heat the reaction mixture, it is customary to do so in order to carry out the reaction within a shorter period of time. Normally the reaction is essentially complete with a reaction time of from 30 minutes to 72 hours at 25–100° C., the longer reaction times being used at lower temperatures. The preferred conditions are 80–85° C. for approximately one hour. The product of the reaction can be obtained in the desired form, as explained in the preceding Formulas I–IV, by adjustment of the pH and proper selection of conditions for isolation of the product.

The starting material required for use in the foregoing process wherein R' represent hydrogen, can be obtained by reacting a phenol of the formula

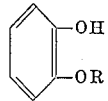

with chloroacetonitrile in the presence of potassium carbonate to give a nitrile of the formula

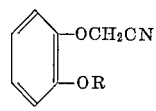

followed by hydrogenating the latter product in the presence of Raney cobalt catalyst to give an amine of the formula

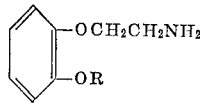

and reacting the latter compound with an ω-halophenone acetal or ketal of the formula

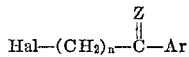

where R, n, Z and Ar are as defined before and Hal represents halogen, preferably chlorine. The ω-halophenone acetals or ketals represented by the foregoing formula can be produced by reacting an ω-halophenone with an alcohol or glycol in the presence of a catalytic amount of p-toluenesulfonic acid. The starting materials required for use in the foregoing process wherein R' represents alkyl, can be obtained by the same general procedure illustrated above but modified to introduce an N-alkyl group into the primary amine intermediate or optionally at another point in the reaction sequence.

The compounds of the invention wherein R', if present, represents hydrogen can also be produced by reacting a cyclic amide of the formula

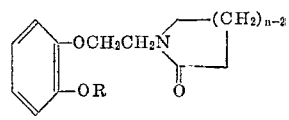

with an aryl reactive metal compound of the formula

Ar—M under anhydrous conditions followed by hydrolyzing the product: where R, n, and Ar are as defined before and M represents a reactive metal substituent such as MgBr, MgI, or lithium. Preferred reactants are the arylmagnesium bromide and the aryllithium compounds. The first step of the process is carried out in a substantially anhydrous, unreactive solvent such as benzene, toluene, xylene, ethyl ether, butyl ether, dioxane, tetrahydrofuran, an aliphatic hydrocarbon, or mixtures of the foregoing. The time and temperature of the reaction are not particularly critical and a temperature range of —40 to +50° C. or somewhat higher is customary with a reaction time of a few minutes up to several hours, the longer reaction times being used at lower temperatures. In most cases, a temperature of about 25–35° C. is used. The cyclic amide and the aryl reactive metal compound are used in approximately equivalent amounts or, if desired, up to a moderate excess of the aryl reactive metal compound is used to ensure optimum conversion of the cyclic amide. The second step of the process is carried out by hydrolyzing the reaction product with an aqueous medium. Either neutral, acidic or basic hydrolysis can be used. The product of the reaction can be obtained in the desired form, as explained in the preceding Formulas I–IV, by adjustment of the pH and proper selection of conditions for isolation of the product.

The starting materials required for use in the foregoing process can be obtained by reacting an amine of the formula

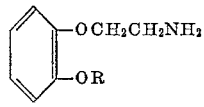

with a lower alkyl ester of an ω-haloalkanoic acid of the formula

Hal—(CH$_2$)$_n$—COO-alkyl where R and n are as defined before and Hal represents halogen, preferably chlorine or bromine.

As previously indicated, the compounds of the invention can exist in various free base and salt forms as illustrated in structures I–IV shown above. The free bases of the invention form ketonic acid-addition salts and anhydro quaternary ammonium salts (imonium salts) with a variety of inorganic and organic acids such as hydrochloric, hydrobromic, hydriodic, sulfuric, perchloric, acetic, citric, maleic, pamoic and related acids. The free bases and their salts with pharmaceutically-acceptable anions have the same pharmacological activities and are generally equivalent for the purposes of the invention. However, the compounds of the invention exhibit maximum stability in salt form and are desirably prepared and used in the forms of their salts. The formation of either the ketonic acid-addition salt or the anhydro quaternary ammonium salt (imonium salt) is influenced by the reaction conditions used during salt formation as well as the particular acid employed. Thus, the formation of the anhydro quaternary ammonium salt (imonium salt) of structure IV is favored when the salt formation is carried out under dehydrating conditions. In general, reaction with hydrochloric acid produces a salt which is almost exclusively the ketonic acid-addition salt of structure II whereas reaction with the perchloric acid produces a salt which is almost exclusively the anhydro quaternary ammonium salt (imonium salt) of structure IV. With the use of other reaction conditions and other acids, it is possible to produce salts which are mixtures of the indicated structures. It is not particularly critical which salt form or which mixture of salt forms is used since in solution the various forms exist in dynamic equilibrium. However, for reasons of ease of preparation and purification, the ketonic acid-addition salts such as the hydrohalides and especially the hydrochlorides are the preferred forms.

The compounds of the invention are useful pharmacological agents and exhibit a depressant effect on the central nervous system. The cerebral depressant effect of the compounds of the invention can be measured in standard experimental animals by measuring the decrease in desoxyephedrine-induced physical movement. By virtue of their anti-excitant properties, the compounds of the invention are of value as tranquilizing agents and in the management of states of agitation. The compounds of the invention are active upon oral administration but can also be given by the parenteral route if desired.

The invention is illustrated by the following examples.

EXAMPLE 1

A mixture of 78 g. 4-{[2-(o-ethoxyphenoxy)-ethyl]amino}-4'-fluorobutyrophenone ethylene ketal, 50 ml. isopropyl alcohol and 150 ml. 1 N hydrochloric acid is heated at reflux for one hour, cooled, placed in a nitrogen atmosphere and stirred with 100 ml. ether and sufficient aqueous sodium hydroxide to basify the aqueous phase. The ether phase is separated and combined with two additional ether extracts of the aqueous phase. The ether solution is washed with water, dried, and treated dropwise with 6 N hydrochloric acid until it is acidic. The insoluble precipitate of 4-{[2-(o-ethoxyphenoxy)ethyl]amino} - 4' - fluorobutyrophenone hydrochloride is collected; M.P. 108–110° C. following crystallization from ethanol-ether, water or acetone. The product is obtained in the form of its cyclic anhydro derivative by treating the dried ether extract indicated above with 1:1 ethanol–70% aqueous perchloric acid until acidic and collecting the insoluble oily product. The oily product is crystallized by triturating it several times with ether. The product is 1-[2-(o-ethoxyphenoxy)ethyl] - 2 - (p - fluorophenyl)-1-pyrrolinium perchlorate; M.P. 109–110° C. following crystallization from methanol-ether.

By the foregoing procedure, the following additional compounds are obtained by hydrolysis of the corresponding ethylene ketals.

4-{[2-(o - ethoxyphenoxy)ethyl]amino}butyrophenone hydrochloride; M.P. 109–110° C. following crystallization from ethanol-ether.

4-{[2 - (o - ethoxyphenoxy)ethyl]amino} - 4' - chlorobutyrophenone hydrochloride; M.P. 124–126° C. following crystallization from ethanol-ether.

1-[2-(o-methoxyphenoxy)ethyl]-2-(p-fluorophenyl) - 1 pyrrolinium perchlorate; M.P. 131–132° C. following crystallization from methanol-ether. The hydrated form of this compound, free base, is 4{[2-(o-methoxyphenoxy) ethyl]amino}-4'-fluorobutyrophenone.

N - methyl - 4-{[2-(o-ethoxyphenoxy)ethyl]-amino}-4'-fluorobutyrophenone hydrochloride; M.P. 111–112° C. following crystallization from isopropyl alcohol-ether.

N - methyl-4-{[2-(o - ethoxyphenoxy)ethyl]-amino}butyrophenone hydrochloride; M.P. 82–84° C. following crystallization from isopropyl alcohol-ether.

N - ethyl - 4 - {[2-(o-ethoxyphenoxy)ethyl]amino}-4'-fluorobutyrophenone hydrochloride; M.P. 142–143° C. following crystallization from acetone-ether.

Starting materials for Example 1

A mixture of 908 g. o-ethoxyphenol, 980 g. potassium carbonate and 2000 ml. acetone is stirred and heated at reflux while 528 g. chloroacetonitrile is added dropwise over a two-hour period. The resulting mixture is stirred and heated at reflux for 16 more hours, cooled, and filtered. The filtrate is evaporated under reduced pressure and the non-volatile oil dissolved in ether. The ether solution is washed with dilute sodium hydroxide solution and with water, dried, and evaporated to give a residue of o-ethoxyphenoxyacetonitrile, B.P. 115–120° C. at 0.5 mm.; M.P. 42–43° C. following crystallization from petroleum ether In the same manner, o-methoxyphenoxyacetonitrile, B.P. 150–159° C. at 19 mm., is prepared from o-methoxyphenol.

A mixture of 897 g. o-ethoxyphenoxyacetonitrile, 500 ml. toluene, 200 ml. triethylamine, and 200 g. Raney cobalt is shaken in a hydrogen atmosphere at 96° C. and 1500 pounds per square inch pressure for 4 hours, or until hydrogen consumption ceases. The mixture is cooled and filtered and the filtrate evaporated to give a residue of 2-(o-ethoxyphenoxy)ethylamine, B.P. 96–104° C. at 0.6 mm. In the same manner, 2-(o-methoxyphenoxy)ethylamine, B.P. 93–95° C. at 0.12 mm. is prepared from o-methoxyphenoxyacetonitrile.

A solution of 243 g. γ-chloro-p-fluorobutyrophenone, 100 ml. ethylene glycol and 1.0 g. p-toluenesulfonic acid is heated under reflux for 48 hours with continuous removal of the water formed in the reaction. The solution is cooled and poured with stirring into dilute sodium bicarbonate solution. The insoluble organic product is separated, washed with water, dried, and distilled. A fraction of γ-chloro-p-fluorobutyrophenone ethylene ketal is collected at B.P. 101–103° C. at 0.2 mm. In the same manner, γ-chlorobutyrophenone ethylene ketal, B.P. 114–118° C. at 0.9 mm. is prepared from γ-chlorobutyrophenone. In the same manner, γ-chloro-p-chlorobutyrophenone ethylene ketal, B.P. 111–117° C. at 0.17 mm. is prepared from γ-chloro-p-chlorobutyrophenone.

A solution of 72.4 g. 2-(o-ethoxyphenoxy)ethylamine and 48.9 g. γ-chloro-p-fluorobutyrophenone ethylene ketal in 300 ml. xylene is heated under reflux for 24 hours. Most of the xylene is removed by distillation and the remaining mixture is cooled and diluted with 300 ml. ether. The insoluble solid is removed by filtration and the filtrate is evaporated to give a residue of 4-{[2-(o-ethoxyphenoxy)ethyl]amino} - 4' - fluorobutyrophenone ethylene ketal, suitable for use without further purification. A hemisulfate salt, M.P. 123–124° C., is obtained by reacting the free base with sulfuric acid in methanol containing 10% 2,2-dimethoxypropane. In the same manner, 4-{[2-(o-ethoxyphenoxy)ethyl]amino}butyrophenone ethylene ketal is prepared from 2-(o-ethoxyphenoxy) ethylamine and γ-chlorobutyrophenone ethylene ketal. In the same manner, 4-{[2-(o-ethoxyphenoxy)ethyl]amino}-4'-chlorobutyrophenone ethylene ketal is prepared from 2-(o-ethoxyphenoxy)ethylamine and γ-chloro- p - chlorobutyrophenone ethylene ketal. In the same manner, 4-{[2 - (o - methoxyphenoxy)ethyl]amino} - 4' - fluorobutyrophenone ethylene ketal is prepared from 2-(o-methoxyphenoxy)ethylamine and γ-chloro-p-fluorobutyrophenone ethylene ketal. In the same manner, N-methyl-4-{[2-o-ethoxyphenoxy)ethyl]amino} - 4' - fluorobutyrophenone ethylene ketal is prepared from N-methyl-2-(o-ethoxyphenoxy)ethylamine and γ - chloro - p - fluorobutyrophenone ethylene ketal. In the same manner, N-methyl - 4 - {[2 - (o-ethoxyphenoxy)ethyl]amino}butyrophenone ethylene ketal is prepared from N-methyl-2-(o-ethoxyphenoxy)ethylamine and γ - chlorobutyrophenone ethylene ketal.

Benzaldehyde, 116 g., is added to a solution of 181 g. 2-(o-ethoxyphenoxy)ethylamine in 500 ml. benzene. The reaction mixture is heated under reflux for two hours with continuous removal of the water formed in the reaction and then evaporated under reduced pressure to remove most of the benzene. The remaining mixture is dissolved in 300 ml. acetonitrile. Methyl iodide, 300 g., is added and the resulting solution allowed to stand at 25° C. for 72 hours. Solvent and excess methyl iodide are removed by evaporation under reduced pressure and the residual product is triturated several times with ether and then stirred with 500 ml. water for 10 minutes. The mixture is washed three times with small portions of ether to remove benzaldehyde, and the aqueous phase is then basified with aqueous sodium hydroxide and extracted with ether. The ether extract is dried and evaporated to leave a residue of N-methyl-2-(o-ethoxyphenoxy) ethylamine; B.P. 86–88° C. at 0.3 mm.

With stirring, 23.5 g. acetyl chloride is slowly added to a solution of 90 g. 4-{[2 - (o - ethoxyphenoxy)ethyl] amino}-4'-fluorobutyrophenone ethylene ketal in 250 ml. pyridine. After one hour, the mixture is evaporated under reduced pressure and the residue extracted with several portions of ether. The ether extract is washed with water, dried, and evaporated to give a residue of N-acetyl-4-{[2-(o-ethoxyphenoxy)ethyl]amino} - 4' - fluorobutyrophenone ethylene ketal. A solution of 95 g. of this compound in 500 ml. ether is added slowly with stirring to a mixture of 18.5 g. lithium aluminum hydride in 1000 ml. ether. The reaction mixture is then hydrolyzed with saturated aqueous potassium carbonate. The mixture is filtered and the ether phase separated, dried and evaporated to give a residue of N-ethyl-4-{[2-(o-ethoxyphenoxy)ethyl]amino} - 4' - fluorobutyrophenone ethylene ketal.

EXAMPLE 2

A solution of 62.4 g. 1-[2-(o-ethoxyphenoxy)-ethyl]-2-pyrrolidone in 300 ml. benzene is added dropwise with stirring to a solution of 42 g. phenyllithium in 1500 ml. ether under a nitrogen atmosphere. The reaction mixture is stirred for one hour and hydrolyzed by the dropwise addition of 500 ml. water with stirring and cooling. The organic phase is separated, washed with water, dried and diluted with 25 ml. ethanol. To this solution is added 70% aqueous perchloric acid until the mixture is acidic. The insoluble product is separated and crystallized by trituration with ether. It is 1-[2-(o-ethoxyphenoxy)-ethyl]-2-phenyl-1-pyrrolinium perchlorate; M.P. 79–80° C. following crystallization from ethanol-ether. The same product is obtained by substituting 90.5 g. phenylmagnesium bromide for the phenyllithium in the above procedure followed by hydrolyzing the reaction mixture with 500 ml. saturated aqueous potassium carbonate. The free base form of this product is 1-[2-(o-ethoxyphenoxy)ethyl]-2-phenyl-2-pyrroline.

By the foregoing procedure, the following additional compounds are obtained.

From 1-[2-(o-ethoxyphenoxy)ethyl]-2-pyrolidone and p-fluorophenyllithium or p-fluorophenylmagnesium bromide, the product is 1-[2-(o-ethoxyphenoxy)ethyl]-2-(p-fluorophenyl)-1-pyrrolinium perchlorate; M.P. 109–110° C. following crystallization from methanol-ether.

From 1-[2-(o-ethoxyphenoxy)ethyl]-2-pyrrolidone and p-methoxyphenyllithium or p-methoxyphenylmagnesium bromide, the product is 1-[2-(o-ethoxyphenoxy)ethyl]-2-(p-methoxyphenyl)-1-pyrrolinium perchlorate; M.P. 91–92° C. following crystallization from methanol-ether.

From 1-[2-(o-ethoxyphenoxy)ethyl]-2-pyrrolidone and p-tolyllithium or p-tolylmagnesium bromide, the product is 1-[2-(o-ethoxyphenoxy)ethyl] - 2 - (p-tolyl)-1-pyrrolinium perchlorate; M.P. 107–108° C. following crystallization from methanol-ether.

From 1-[2-(o-propoxyphenoxy)ethyl] - 2 - pyrrolidone and p-fluorophenyllithium or p-fluorophenylmagnesium bromide, the product is 1-[2-(o-propoxyphenoxy)ethyl]-2-(p-fluorophenyl)-1-pyrrolinium perchlorate; M.P. 78–79° C. following crystallization from methanol-ether.

From 1-[2-(o-ethoxyphenoxy)ethyl]-2-piperidone and p-fluorophenyllithium or p-fluorophenylmagnesium bromide, the product is 1-[2-(o-ethoxyphenoxy)ethyl]-2-(p-fluorophenyl)3,4,5,6-tetrahydropyridinium perchlorate; M.P. 109–110° C. following crystallization from methanol-ether.

Starting materials for Example 2

A solution of 725 g. 2-(o-ethoxyphenoxy)ethylamine and 300 g. methyl γ-chlorobutyrate in 2500 ml. toluene is heated at reflux for 48 hours. About 1500 ml. of toluene is removed by distillation under reduced pressure and the remaining mixture is diluted with 3000 ml. ether. The insoluble 2-(o-ethoxyphenoxy)ethylamine hydrochloride which separates at this point is removed by filtration. The filtrate is evaporated under reduced pressure and the oily residue distilled. A fraction of 1-[2-(o-ethoxyphenoxy)ethyl]-2-pyrrolidone is collected at B.P. 165–170° C. at 0.5 mm.; it has M.P. 55–58° C. following crystallization from benzene-petroleum ether. In the same manner, the product obtained from 2-(o-ethoxyphenoxy)ethylamine and methyl 5-bromovalerate is 1-[2-(o-ethoxyphenoxy)ethyl]-2-piperidone; B.P. 175–180° C. at 0.7 mm.

By the general procedure illustrated in greater detail in the section entitled "Starting Material for Example 1," o-propoxyphenol is reacted with chloroacetonitrile in acetone solution in the presence of potassium carbonate to give o-propoxyphenoxyacetonitrile; B.P. 105–110° C. at 0.3 mm. This compound in a mixture of toluene and triethylamine is hydrogenated with Raney cobalt catalyst to give 2-(o-propoxyphenoxy)ethylamine; B.P. 125–130° C. at 8 mm. The latter compound is reacted with methyl γ-chlorobutyrate in toluene solution by the general procedure described above to give 1-[2-(o-porpoxyphenoxy)ethyl]-2-pyrrolidone; B.P. 175–180° C. at 0.5 mm.

The phenyllithium compounds and phenylmagnesium halide compounds are obtained by reacting an appropriately substituted benzene derivative with lithium, butyllithium, or magnesium under anhydrous conditions in a non-hydroxylic solvent.

EXAMPLE 3

A solution of 142 g. 1-[2-(o-ethoxyphenoxy)-ethyl]-2-pyrrolidone in 300 ml. benzene is added rapidly to a stirred solution of 227 g. p-fluorophenylmagnesium bromide (prepared from 1-bromo-4-fluorobenzene and magnesium) in 1500 ml. ether in a nitrogen atmosphere. The mixture is stirred and heated at reflux for one hour, cooled, and hydrolyzed by the slow addition of 425 ml. of 24% aqueous hydrobromic acid. The mixture is chilled and the insoluble hydrobromide salt is collected on a filter. The product is suspended in 1000 ml. water, the mixture basified in a nitrogen atmosphere with 40% aqueous sodium hydroxide and extracted twice with 300 ml. portions of benzene. The combined benzene extract is stirred with 350 ml. 36% aqueous hydrochloric acid and the mixture is cooled. The insoluble 4 - {[2 - (o - ethoxyphenoxy)ethyl]amino} - 4' - fluorobutyrophenone hydrochloride which separates is collected; M.P. 108–110° C. following crystallization from acetone. The same product is obtained by adding a solution of 62.4 g. 1-[2-(o-ethoxyphenoxy)ethyl]-2-pyrrolidone in 300 ml. benzene to a stirred solution of 51 g. p-fluorophenyllithium (prepared from 1-bromo-4-fluorobenzene and lithium) in 1500 ml. ether in a nitrogen atmosphere; followed by hydrolyzing the mixture with 500 ml. water, separating the organic layer, washing the organic layer with water and then stirring it vigorously with dilute hydrochloric acid, and collecting the insoluble product.

By the foregoing procedure, the following additional compounds are obtained.

From 1-[2-(o-ethoxyphenoxy)ethyl]-2-pyrrolidone and phenylmagnesium bromide or phenyllithium, the product is 4 - {[2-(o-ethoxyphenoxy)ethyl]amino}butyrophenone hydrochloride; M.P. 109–110° C. following crystallization from ethanol-ether.

From 1-[2-(o-ethoxyphenoxy) ethyl]-2-pyrrolidone and m-tolylmagnesium bromide or m-tolyllithium, the product is 4-{[2-(o-ethoxyphenoxy)ethyl]-amino}-3'-methylbutyrophenone hydrochloride; M.P. 70–71° C. following crystallization from water.

From 1-[2-(o-ethoxyphenoxy)ethyl]-2-pyrrolidone and m-(trifluoromethyl)phenylmagnesium bromide, the product is 4-{[2-(o-ethoxyphenoxy)ethyl]amino}-3'-(trifluoromethyl)butyrophenone hydrochloride, M.P. 131–132° C. following crystallization from acetone ether. The m-(trifluoromethyl)phenylmagnesium bromide is prepared by reacting 1-bromo-3-(trifluoromethyl)benzene and magnesium.

From 1-[2-(o-ethoxyphenoxy) ethyl]-2-pyrrolidone and m-chlorophenylmagnesium bromide, the product is 4-{[2-(o - ethoxyphenoxy)ethyl]amino-3'-chlorobutyrophenone hydrochloride; M.P. 125–126° C. following crystallization from acetone-ether. The m-chlorophenylmagnesium bromide is prepared by reacting 1-bromo-3-chlorobenzene with magnesium.

From 1-[2-(o-ethoxyphenoxy)ethyl]-2-pyrrolidone and o-(trifluoromethyl)phenyllithium, the product is 4-{[2-(o-ethoxyphenoxy)ethyl]amino}-2'-(trifluoromethyl)butyrophenone hydrochloride; M.P. 62–64° C. following crystallization from acetone-ether. The o-(trifluoromethyl)-phenyllithium is prepared by reacting butyllithium with 1-bromo-2-(trifluoromethyl)benzene.

From 1 - [2 - (o-ethoxyphenoxy)ethyl] - 2-pyrrolidone and 2-pyridyllithium, the product is 4-{[2-(o-ethoxyphenoxy)ethyl]amino}-1-(2-pyridyl) - 1 - butanone dihydrochloride; sesquihydrate, M.P. 137–139° C. following crystallization from ethanol-ether. The 2 - pyridyllithium is prepared by reacting butyllithium with 2-bromopyridine.

EXAMPLE 4

A solution of 2-thienyllithium is prepared under a nitrogen atmosphere by adding a 22% solution of butyllithium (in pentane) containing 64 g. butyllithium to a stirred solution of 105 g. thiophane in 1000 ml. ether. This solution is stirred 15 minutes and then treated dropwise with a solution of 62.3 g. 1-[2-(o-ethoxyphenoxy)ethyl]-2-pyrrolidone in 250 ml. benzene. The mixture is stirred for one hour, treated dropwise with 500 ml. water, and the organic layer separated, washed with water, and treated dropwise with dilute hydrochloric acid until acidic. The insoluble 4 - {[2 - (o - ethoxyphenoxy)ethyl] - amino} - 1-(2-thienyl)-1-butanone hydrochloride is collected on a filter; M.P. 113–114° C. following crystallization from aqueous ethanol-ether.

We claim:

1. A member of the class consisting of compounds of the formula

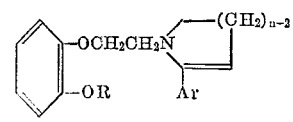

and compounds of the formula

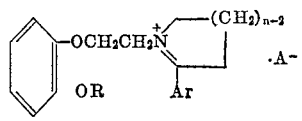

where R is alkyl of fewer than 4 carbon atoms; $n$ is a member of the class consisting of the integers 3 and 4; Ar is a member of the class consisting of phenyl, monofluorophenyl, monochlorophenyl, tolyl, monomethoxyphenyl, and mono(trifluoromethyl)phenyl; and A is one equivalent of a pharmaceutically-acceptable anion.

No references cited.

ALEX MAZEL, Primary Examiner

J. TOVAR, Assistant Examiner

U.S. Cl. X.R.

260—294.7, 294.8, 297, 326.3, 326.5, 570.5, 570.7; 424—263, 274